Aug. 18, 1959          G. F. CARLSON          2,899,973
PRESSURE REDUCING VALVE
Filed Oct. 16, 1956

Inventor
Gilbert F. Carlson
By
Mann Brown & McWilliams
Attorneys

United States Patent Office 2,899,973
Patented Aug. 18, 1959

2,899,973

PRESSURE REDUCING VALVE

Gilbert F. Carlson, Skokie, Ill. assignor to Bell & Gossett Company, Morton Grove, Ill., a corporation of Illinois Application October 16, 1956, Serial No. 616,218

3 Claims. (Cl. 137—505.41)

This invention relates to pressure reducing valves and is more particularly concerned with such valves as used with hot water boilers.

While the present valve is capable of general application as a means of automatically controlling fluid flow from a source of supply to a device to be serviced, it is conveniently described as a water supply control for a hot water boiler. A valve of this type is interposed between the boiler and a source of feed water such as a city main, and is conditioned to automatically open and supply water to the boiler when the latter's pressure is sufficiently low and the boiler can receive the water. Compounds of various kinds are frequently introduced in hot water boilers as a means of preventing or reducing corrosion, liming or other incrustation of the boiler. Water so treated is not as pure as that in a city main and health authorities are becoming increasingly concerned over the possibility of water flow from the boiler through the valve which would contaminate the water in the main.

A situation of this kind may arise in a locality due to pressure drop in the main occasioned by excessive use of water in fighting a fire, or by a break in the main. If the pressure in one or more boilers in such locality is then below the setting of the reducing valve but higher than the pressure in the main, the valve will be opened by its spring and water will flow from the boiler to the main.

It is therefore one object of the invention to provide a pressure reducing valve which is arranged to automatically operate in the usual manner to supply fresh water to the boiler and is additionally conditioned to prevent reverse flow through the valve when the latter is open.

A further object is to provide a pressure reducing valve having the characteristic operation and including a check valve for preventing reverse flow through the reducing valve when open.

These and further objects of the invention will be set forth in the following specification, reference being had to the accompanying drawing, and the novel means by which the objects are effectuated will be definitely pointed out in the claims.

Figure 1:
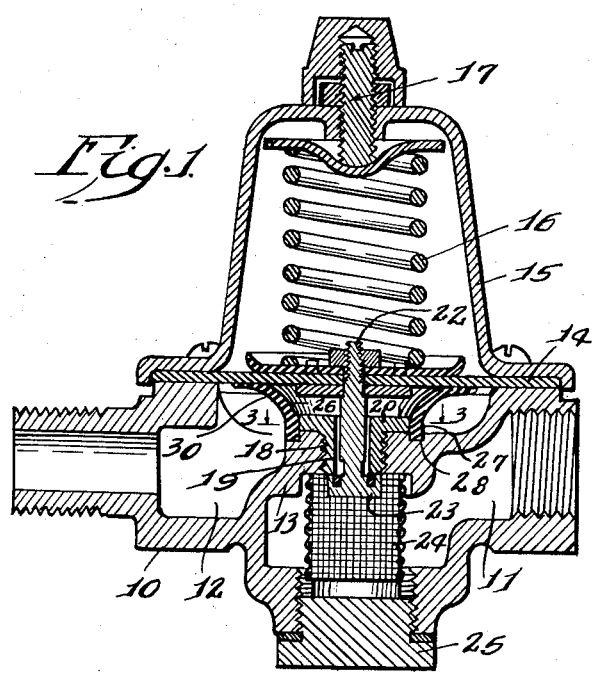
Fig. 1 is a sectional elevation of one form of the reducing valve with all valving elements closed.

Referring to Fig. 1, the numeral 10 designates a valve body having an inlet chamber 11 arranged for connection to a water supply under pressure, such as a city main, and an outlet chamber 12 adapted for connection to a unit to be serviced, such as a hot water boiler, the chambers being separated by a wall 13 internally of the valve body 10. The upper portion of the chamber 12 is closed by a diaphragm 14 whose periphery is clamped to the valve body 10 by a housing 15.

Within the housing 15 is positioned the usual helical spring 16 for loading the diaphragm 14 by means of the well known adjusting arrangement generally indicated by the numeral 17. Threaded through an opening in the wall 13 is a flanged plug 18 having a passage 19 extending therethrough coaxial with the diaphragm 14 and spring 16. The plug flange 20 abuts the upper surface of the wall 13 and its peripheral surface is preferably shaped for anchorage attachment to a check valve as presently described, a suggested shape being that of a hexagon as indicated by the numeral 21 in Fig. 3. The upper end of a valve stem 22 is secured to the central part of the diaphragm 14, extends downwardly through and in clearance relation to the plug passage 19 and terminates in a valve disk 23 which when in closed position, as shown, abuts the adjacent end of the plug 18 as a valve seat. If desired, a cylindrical screen 24 may be supported between a plug 25 in the valve body 10 and the under side of the wall 13 in encircling relation to the valve disk 23 for collecting dirt and miscellaneous particles in water entering the chamber 11.

So far as described, the reducing valve is of the well known type. Assuming that the valve is connected in the usual manner to a hot water boiler and a supply of fresh water under pressure, then as long as the boiler pressure is such that the total pressure acting against the under side of the diaphragm 14 exceeds the loading of the spring 16, the valve disk 23 will occupy the closed position shown. When this relative pressure situation is reversed, the spring 16 moves the diaphragm 14 downwardly to shift the valve disk 23 to open position. If at this time, the pressure in the inlet chamber 11 is above that in the outlet chamber 12 and the boiler can receive water, the latter will flow through the reducing valve to the boiler.

For reasons noted above, the pressure in the chamber 11 may at some time be less than that in the chamber 12 and the value of the latter pressure may be such as to enable the spring 16 to open the valve disk 23 and permit the relatively unclean water from the boiler to flow to the city main. It is the purpose of a member having check valve characteristics to prevent this action while not interfering with the normal operation of the reducing valve in its automatic control on the cold water supply.

Figure 2:
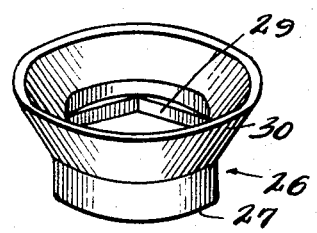
Fig. 2 is a slightly enlarged, perspective view of the check valve element in Fig. 1.
Figure 3:
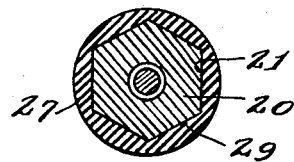
Fig. 3 is a detail section along the line 3—3 in Fig. 1.

Referring to Figs. 1, 2 and 3, the numeral 26 designates the improved check valve which is preferably made of molded rubber that is conditioned to withstand the operating temperatures and corrosive factors present. The valve 26 includes an annular base 27 which sits in a like shaped recess 28 in the wall 13 adjacent the periphery of the plug flange 20 and the inner wall surface of the base 27 is hexagon shaped at 29 (see Figs. 2 and 3) for slightly stretched fitting around the shoulder 20 and appropriate anchorage thereto. Above the base 27, the valve 26 flares outwardly to provide a flexible, annular lip 30 having a frustoconical shape when not under flexure. The edge face of the lip 30 preferably seats against the under surface of the diaphragm 14 in the closed position of the valve disk 23 to insure that this seating relation will exist when the diaphragm is flexed downwardly.

From the foregoing, it will be apparent that when the reducing valve opens during normal operation, i.e., pressure in the chamber 11 above that in chamber 12, water will flow through the valve from the high to the low side, the lip 30 flexing and separating from the diaphragm 14 under the then inlet pressure. However, if the pressure conditions are reversed when the valve disk 23 is open, i.e., pressure in the chamber 12 above that in chamber 11, water will not flow from the then high to the low side because the higher pressure in the chamber 12 will flex the lip 30 into sealing contact with the diaphragm 14. The boiler water will therefore be contained.

Figure 4:
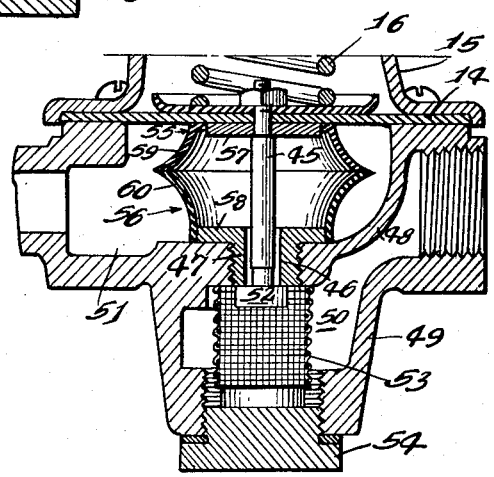
Fig. 4 is a sectional elevation of a modified form of the reducing valve.

In Fig. 4 is shown a modification wherein some parts are identical with those included in Fig. 1 and are designated by like numerals.

As in the other embodiment of the reducing valve, the diaphragm 14 is connected to the upper end of a valve stem 45 which extends downwardly through and in clearance relation to a passage 46 in a plug 47 threaded through a wall 48 in a valve body 49. The wall 48 divides the interior of the body 49 into inlet and outlet chambers 50 and 51 as heretofore defined which are communicable through the passage 46 under the control of a valve disk 52 carried by the lower end of the valve stem 45 and operably related to the lower end of the plug 47 as a seat. A cylindrical screen 53 may be interposed in encircling relation to the valve disk 52 between the under side of the wall 48 and a plug 54 threaded in the valve body 49 for the same purpose as in Fig. 1.

Located between the under side of the diaphragm 14 and the upper side of the wall 48 in coaxial relation to the passage 46 is a pair of flaring, annular cups 55 and 56, each preferably composed of molded rubber. The small or base end of the cup 55 may be stretched around the periphery of a washer 57 clamped to the under side of the diaphragm 14 while the like end of the cup 56 has like relation to the periphery of a flange 58 which forms a part of the plug 47 and abuts the upper side of the wall 48. The peripheries of the washer 57 and flange 58 may be hexagon shaped for the same reason as the flange 20 in Fig. 1. The annular lips 59 and 60 of the cups 55 and 56, respectively, are flexible and their edge faces abut as shown in Fig. 4.

During normal operation, i.e., when pressure in the chamber 51 is such that the loading of the spring 16 is greater than the total pressure acting upwardly against the diaphragm to thereby open the valve disk 52 and the pressure in the chamber 50 is above that in the chamber 51, water will flow from the former to the latter chamber. The cups 55 and 56 do not interfere with this flow because the inlet chamber pressure effects a separation of the flexible lips 59 and 60. However, reverse flow from the chamber 51 to the chamber 50 with the valve disk 52 open under the special conditions outlined above is effectively prevented since the pressure in the chamber 51 causes the abutting edge faces of lips 59 and 60 to seal tightly. Cooperatively, therefore, the cups 55 and 56 act as a check valve to prevent this reverse flow.

I claim:

1. In a pressure reducing valve comprising a valve body including an inlet and an outlet separated by a wall within the body and passage means in the wall for connecting the inlet and outlet, a valve member for controlling flow through the passage means from the inlet to the outlet, a diaphragm connected to the valve member and responsive to pressure in the outlet for shifting the valve member to closed position, and a spring loading the diaphragm for biasing the valve member towards an open position, the improvement that comprises check valve means including a flaring, annular cup having its base seated on the wall in coaxial relation to one end of the passage means and a flexible lip adapted for sealing contact with the diaphragm to prevent flow from the outlet through the inlet when the valve member is open and the outlet pressure is above that of the inlet.

2. In a pressure reducing valve comprising a valve body including an inlet and an outlet separated by a wall within the body and passage means in the wall for connecting the inlet and outlet, a valve member for controlling flow through the passage means from the inlet to the outlet, a diaphragm connected to the valve member and responsive to pressure in the outlet for shifting the valve member to closed position, and a spring loading the diaphragm for biasing the valve member towards an open position, the improvement that comprises resilient annular check valve means in coaxial relation to one end of the passage means and held under compression between said wall and said diaphragm in all positions of the diaphragm to normally isolate said outlet from said passage means, said resilient check valve means including an outwardly flared portion bendable by inlet pressure that is greater than the outlet pressure to open the check valve means and permit flow from the inlet to the outlet.

3. A pressure reducing valve as defined in claim 2 wherein said outwardly flared portion is carried by said wall and flares outwardly and upwardly therefrom, and wherein said resilient check valve means also includes a second outwardly flared portion carried by said diaphragm and flaring outwardly and downwardly from the diaphragm for normal sealing contact with said first mentioned outwardly flared portion, said second outwardly flared portion being bendable by inlet pressure that is greater than the outlet pressure to cooperate with said first mentioned outwardly flared portion in opening said check valve means.

References Cited in the file of this patent

UNITED STATES PATENTS

| 2,088,685 | Birch | Aug. 3, 1937 |
| 2,674,829 | St. Clair | Apr. 13, 1954 |
| 2,746,471 | Cobb | May 22, 1956 |

FOREIGN PATENTS

| 465,242 | Italy | Aug. 16, 1951 |